US011161282B2

(12) United States Patent
Chapman et al.

(10) Patent No.: US 11,161,282 B2
(45) Date of Patent: *Nov. 2, 2021

(54) SYSTEMS AND METHODS FOR INCREMENTALLY FORMING A COMPOSITE PART

(71) Applicant: The Boeing Company, Chicago, IL (US)

(72) Inventors: Michael Robert Chapman, Federal Way, WA (US); Charles M. Richards, Kent, WA (US); Jeffrey M. Hansen, Renton, WA (US); Robert L. Anderson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 96 days.

This patent is subject to a terminal disclaimer.

(21) Appl. No.: 16/580,126

(22) Filed: Sep. 24, 2019

(65) Prior Publication Data

US 2020/0016797 A1 Jan. 16, 2020

Related U.S. Application Data

(63) Continuation of application No. 14/808,989, filed on Jul. 24, 2015, now Pat. No. 10,456,960.

(51) Int. Cl.
*B29C 43/10* (2006.01)
*B29C 70/44* (2006.01)
(Continued)

(52) U.S. Cl.
CPC .............. *B29C 43/10* (2013.01); *B29C 70/44* (2013.01); *B29C 2043/3649* (2013.01);
(Continued)

(58) Field of Classification Search
CPC ........ B29C 70/34; B29C 70/342; B29C 43/22
See application file for complete search history.

(56) References Cited

U.S. PATENT DOCUMENTS 4,475,976 A * 10/1984 Mittelstadt ............ B29C 70/342
100/211
4,720,255 A * 1/1988 Mittelstadt .............. B29C 53/04
425/394

(Continued)

FOREIGN PATENT DOCUMENTS

| JP | 2007253441 | 10/2007 |
| JP | 2009166279 | 7/2009 |
| WO | WO 2013/097854 | 7/2013 |

OTHER PUBLICATIONS

Extended European Search Report, European Patent Office, issued for related European Application No. EP 16 17 2491 dated Jan. 30, 2017.

(Continued)

*Primary Examiner* — Matthew J Daniels
*Assistant Examiner* — Andrew D Graham
(74) *Attorney, Agent, or Firm* — Dascenzo Gates Intellectual Property Law, P.C.

(57) ABSTRACT

Systems and methods for incrementally forming a composite part are disclosed herein. The systems include a forming mandrel, which includes a forming surface, and a forming machine. The forming machine includes a forming bladder, a pressure-regulating device, and a positioning device. The forming bladder is configured to be inflated to a forming pressure and to press the ply of composite material against the forming surface. The methods include placing a ply of composite material on a forming surface of a forming mandrel and pressing a forming bladder against the ply of composite material at a selected location to press a selected portion of the ply of composite material against the forming (Continued)

surface and conform the selected portion of the ply of composite material to a surface profile of the forming surface. The methods further include repeating the pressing a plurality of times at a plurality of selected locations.

20 Claims, 8 Drawing Sheets

(51) Int. Cl.
   *B29L 31/00* (2006.01)
   *B29C 43/36* (2006.01)
   *B29L 31/30* (2006.01)
(52) U.S. Cl.
   CPC ..... *B29L 2031/00* (2013.01); *B29L 2031/001* (2013.01); *B29L 2031/3076* (2013.01)

(56) References Cited

U.S. PATENT DOCUMENTS

| | | | |
|---|---|---|---|
| 5,366,684 A * | 11/1994 | Corneau, Jr. | B29C 43/3642 156/285 |
| 5,772,950 A * | 6/1998 | Brustad | B29C 53/025 156/222 |
| 6,458,306 B1 | 10/2002 | Nelson et al. | |
| 6,814,916 B2 | 11/2004 | Willden et al. | |
| 7,118,370 B2 | 10/2006 | Willden et al. | |
| 7,527,759 B2 | 5/2009 | Lee | |
| 7,861,969 B2 | 1/2011 | Guzman et al. | |
| 8,052,823 B2 | 11/2011 | Benson et al. | |
| 8,597,015 B2 | 12/2013 | Henderson | |
| 8,826,509 B2 | 9/2014 | Bergmann et al. | |
| 8,900,505 B2 | 12/2014 | Li et al. | |
| 9,023,265 B1 * | 5/2015 | Rotter | B29C 53/24 264/258 |
| 9,162,396 B2 | 10/2015 | Coxon et al. | |
| 9,573,350 B2 | 2/2017 | Halbritter | |
| 9,604,394 B2 | 3/2017 | Bergmann | |
| 9,604,417 B2 | 3/2017 | Modin | |
| 10,239,251 B2 * | 3/2019 | Deck | B29C 53/82 |
| 2004/0041304 A1 * | 3/2004 | Willden | B29C 70/342 264/324 |
| 2004/0043196 A1 * | 3/2004 | Willden | B29C 43/3642 428/174 |
| 2006/0231981 A1 * | 10/2006 | Lee | B29C 33/307 264/320 |
| 2007/0176323 A1 * | 8/2007 | Jones | B29C 70/46 264/258 |
| 2007/0205053 A1 * | 9/2007 | Isham | B29C 43/003 182/207 |
| 2010/0024971 A1 * | 2/2010 | Benson | B29C 70/32 156/245 |
| 2010/0269979 A1 | 10/2010 | Abitz | |
| 2011/0259515 A1 * | 10/2011 | Rotter | B29C 70/382 156/285 |
| 2012/0153539 A1 * | 6/2012 | Henderson | B29C 70/38 264/294 |
| 2012/0258276 A1 * | 10/2012 | Modin | B29C 70/443 428/98 |
| 2013/0097849 A1 * | 4/2013 | Bergmann | B23P 23/00 29/527.1 |
| 2013/0341816 A1 * | 12/2013 | Bergmann | B29C 43/58 264/40.1 |
| 2016/0200083 A1 * | 7/2016 | Halbritter | B29C 63/16 156/249 |
| 2016/0368226 A1 | 12/2016 | Encinosa et al. | |

OTHER PUBLICATIONS

Hooper et al., "Advancements in Automated Fabrication and Inspection of Aerospace Grade Composite Structures," Composites and Advanced Materials Expo (CAMX 2014), Orlando, Florida, Oct. 13-16, 2015.
Japan Patent Office, Japanese Office Action for related Japanese Patent Application No. 2016139934, dated Jun. 9, 2020 (in original Japanese).
English translation of Japan Patent Office, Japanese Office Action for related Japanese Patent Application No. 2016139934, dated Jun. 9, 2020.
Machine-generated English translation of the abstract of JP 2007253441, downloaded from Espacenet.com on Jul. 24, 2020.
Machine-generated English translation of the abstract of JP 2009166279, downloaded from Espacenet.com on Jul. 24, 2020.

* cited by examiner

SYSTEMS AND METHODS FOR INCREMENTALLY FORMING A COMPOSITE PART

RELATED APPLICATION

This application is a divisional of and claims priority to U.S. patent application Ser. No. 14/808,989, filed on Jul. 24, 2015, entitled "SYSTEMS AND METHODS FOR INCREMENTALLY FORMING A COMPOSITE PART," issued on Oct. 29, 2019 as U.S. Pat. No. 10,456,960, and the complete disclosure of which is incorporated herein by reference.

FIELD

The present disclosure relates to systems and methods for incrementally forming a composite part, and more particularly to systems and methods that include and/or utilize a forming machine that includes a forming bladder to incrementally form the composite part.

BACKGROUND

Fabrication of large composite parts, such as components of aircraft, often may involve kitting, layup, assembly, and/or curing of elongate composite parts that may be many tens, or even over a hundred feet long. Fabrication of such elongate composite parts presents unique manufacturing challenges.

Traditional manufacturing methods for fabricating composite parts include manually locating a plurality of plies of composite material on a layup mandrel to form a composite layup, with each ply of the plurality of plies generally being coextensive with a remainder of the plurality of plies in the composite part. The composite layup subsequently is cured, on the layup mandrel, to form the composite part. While such traditional manufacturing methods may be effective at forming smaller composite parts, they may be inefficient when applied to forming larger composite parts. As an example, a manufacturing floor space needed to fabricate large composite parts utilizing traditional manufacturing methods may be substantial. As another example, an amount of time required to fabricate large composite parts utilizing traditional manufacturing methods may be quite large. As yet another example, there may be ergonomic concerns when large composite parts are fabricated manually.

Any of these manufacturing constraints may increase the cost of, or present safety challenges during, fabrication of the large composite part. Thus, there exists a need for improved composite part fabrication systems and methods.

SUMMARY

Systems and methods for incrementally forming a composite part are disclosed herein. The systems include a forming mandrel, which includes a forming surface. A surface profile of the forming surface corresponds to a surface profile of the composite part and the forming surface is configured to receive a ply of composite material. The systems also include a forming machine. The forming machine includes a forming bladder, which defines an internal volume, a pressure-regulating device, which is configured to regulate a pressure within the internal volume, and a positioning device, which is configured to selectively position the forming bladder relative to the forming surface at a plurality of selected locations. The forming bladder is configured to be inflated to a forming pressure and to press the ply of composite material against the forming surface at each of a plurality of selected locations to conform corresponding portions of the ply of composite material to the surface profile of the forming surface and at least partially define the composite part.

The methods include placing a ply of composite material on a forming surface of a forming mandrel and pressing a forming bladder against the ply of composite material at a selected location to press a selected portion of the ply of composite material against the forming surface and conform the selected portion of the ply of composite material to a surface profile of the forming surface. The methods also include repeating the pressing a plurality of times at a plurality of selected locations to selectively and operatively press the ply of composite material against the forming surface at each of the plurality of selected locations and to conform corresponding portions of the ply of composite material to the surface profile of the forming surface.

DESCRIPTION

Figure 1:
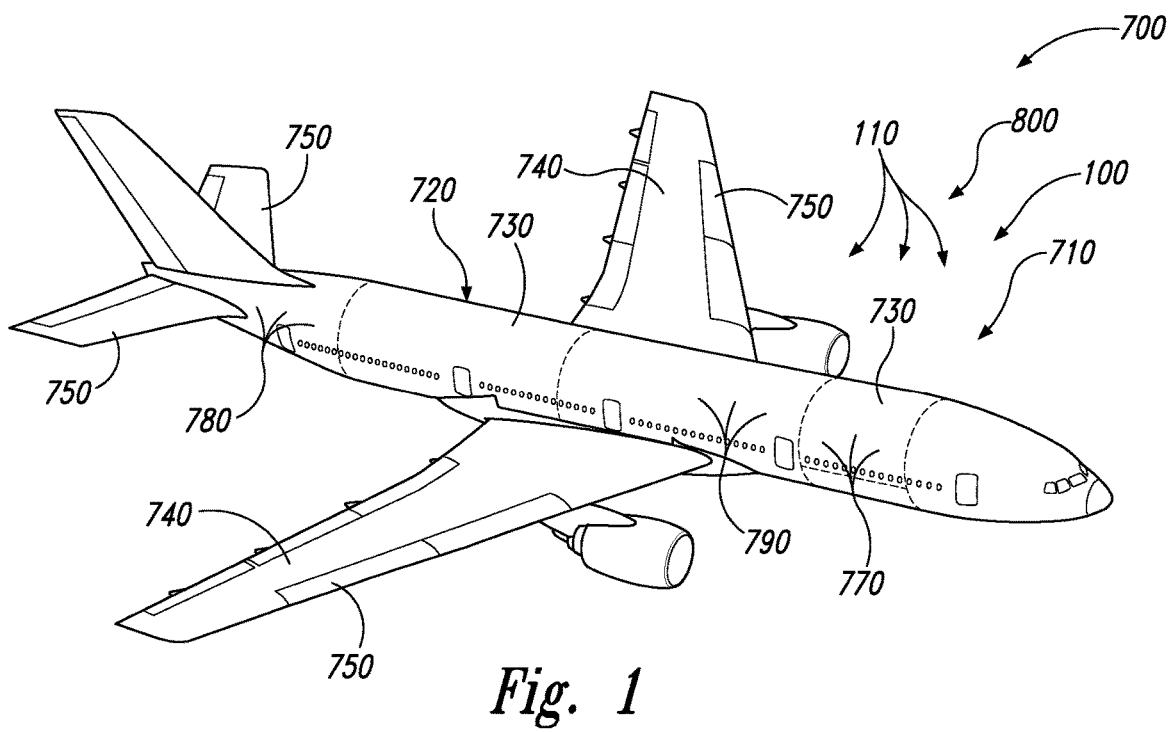
FIG. 1 is an example of an aircraft that includes a composite structure that may be formed using the systems and methods according to the present disclosure.

FIGS. 1-19 provide examples of aircraft 700 that include one or more composite parts 100 that may be formed utilizing the systems and methods according to the present disclosure, of systems 20, according to the present disclosure, for incrementally forming a composite part, and/or of methods 200, according to the present disclosure, of incrementally forming the composite part. Elements that serve a similar, or at least substantially similar, purpose are labeled with like numbers in each of FIGS. 1-19, and these elements may not be discussed in detail herein with reference to each of FIGS. 1-19. Similarly, all elements may not be labeled in each of FIGS. 1-19, but reference numerals associated therewith may be utilized herein for consistency. Elements, components, and/or features that are discussed herein with reference to one or more of FIGS. 1-19 may be included in and/or utilized with any of FIGS. 1-19 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

Figure 2:
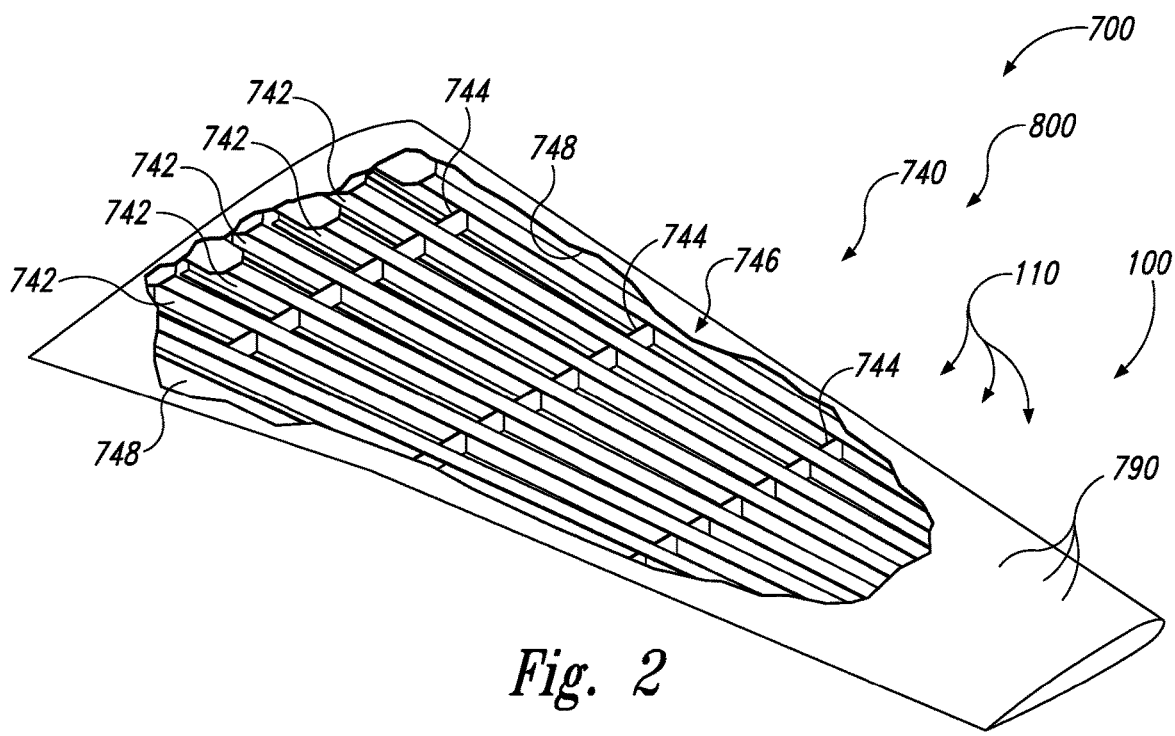
FIG. 2 is an example of a wing that may form a portion of the aircraft of FIG. 1.

FIG. 1 is an example of an aircraft 700 that includes a composite structure 800 that may include a composite part 100 that may be at least partially constructed utilizing systems 20 and/or methods 200, according to the present disclosure. FIG. 2 is an example of a wing 740 that may form a portion of aircraft 700. Aircraft 700 may include a plurality of components, including an airframe 710, a fuselage 720, a fuselage barrel 730, wing 740, and/or a stabilizer 750.

Composite structure 800 of aircraft 700 may include a plurality of plies 110 of composite material, which may form composite part 100 and/or which may form a portion of any suitable component of aircraft 700. As an example, and as illustrated in FIG. 1, aircraft 700 may include skin segments 790 that may form, cover, and/or be an outer surface of any suitable portion of aircraft 700 and/or a plurality of stringers 770 that, together with a plurality of frames 780, may support an inner surface of skin segments 790. As another example, and as illustrated in FIG. 2, wing 740 may include a plurality of wing stringers 742, which may extend along a length of the wing. Wing 740 also may include a plurality of ribs 744, which also may be referred to herein as spars 744. Wing stringers 742 and ribs 744 together may form and/or define at least a portion of an inner support structure 746 for wing 740 which may support an inner surface 748 of skin segments 790 that cover wing 740. These skin segments also may be referred to herein as wing skin segments 790. It is within the scope of the present disclosure that skin segments 790 (or wing skin segments 790), stringers 770, frames 780, wing stringers 742, ribs 744, and/or inner support structure 746 may be at least partially, or even completely, formed from plies 110 of composite material and/or may be a composite part 100 that may be formed utilizing the systems and/or methods disclosed herein.

Figure 3:
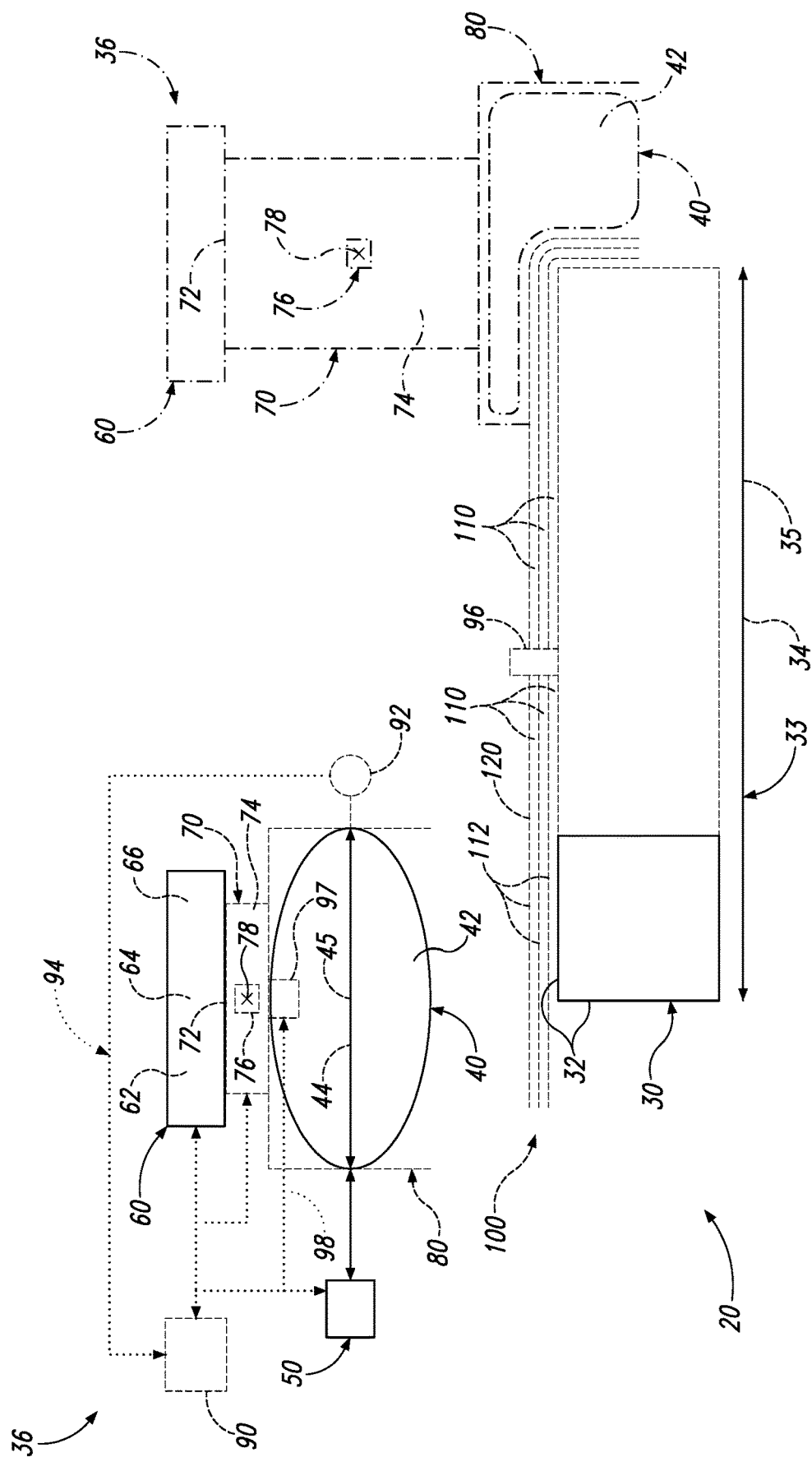
FIG. 3 is a schematic representation of examples of a system, according to the present disclosure, for incrementally forming a composite part.
Figure 4:
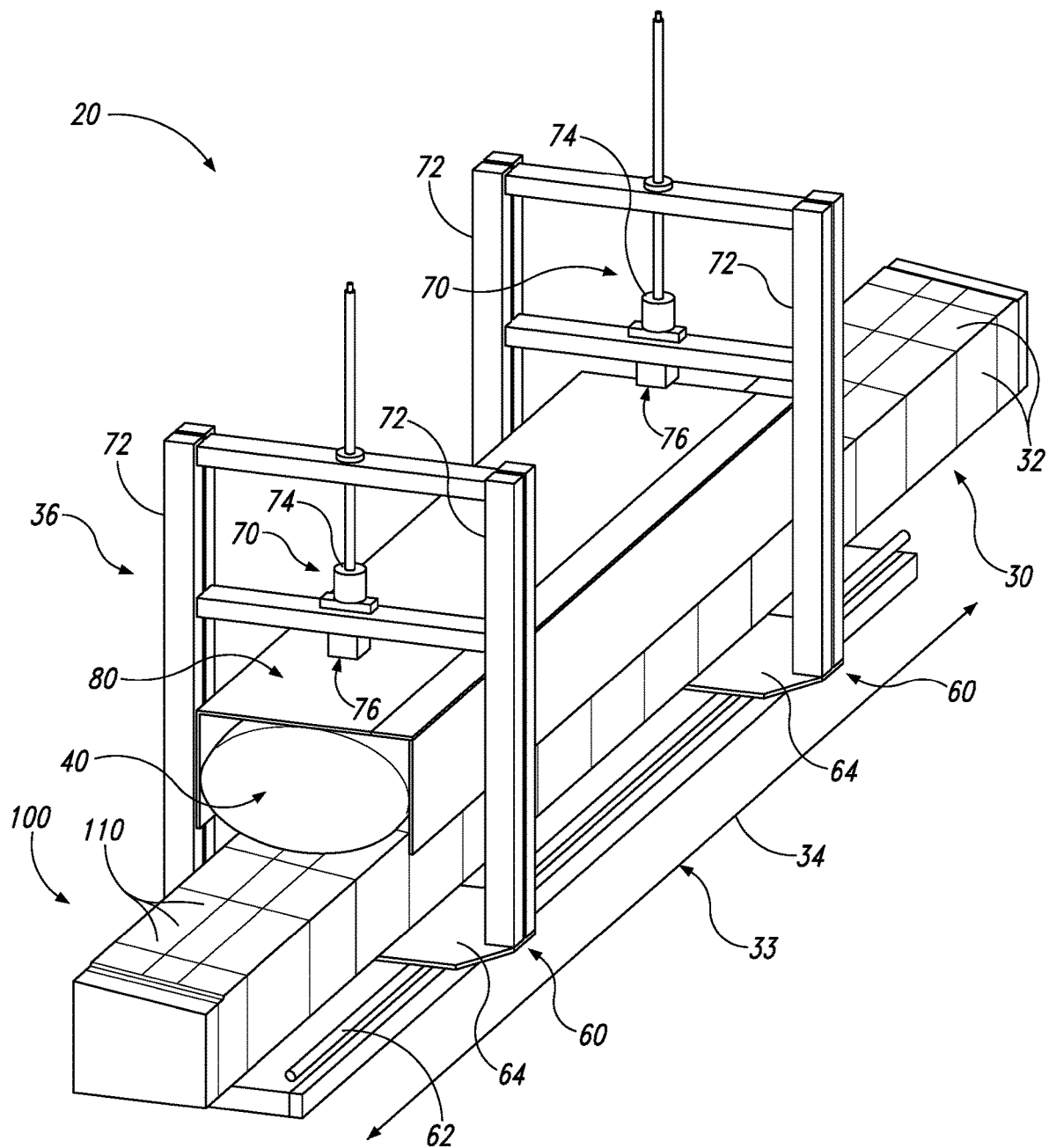
FIG. 4 is a less schematic profile view of a system, according to the present disclosure, for incrementally forming a composite part.
Figure 5:
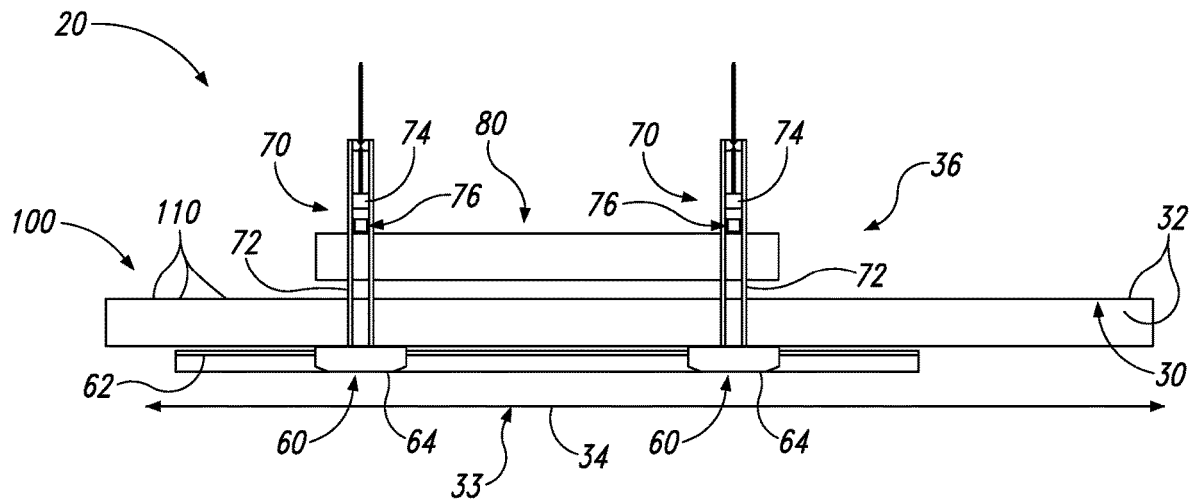
FIG. 5 is a less schematic side view of the system of FIG. 4.
Figure 6:
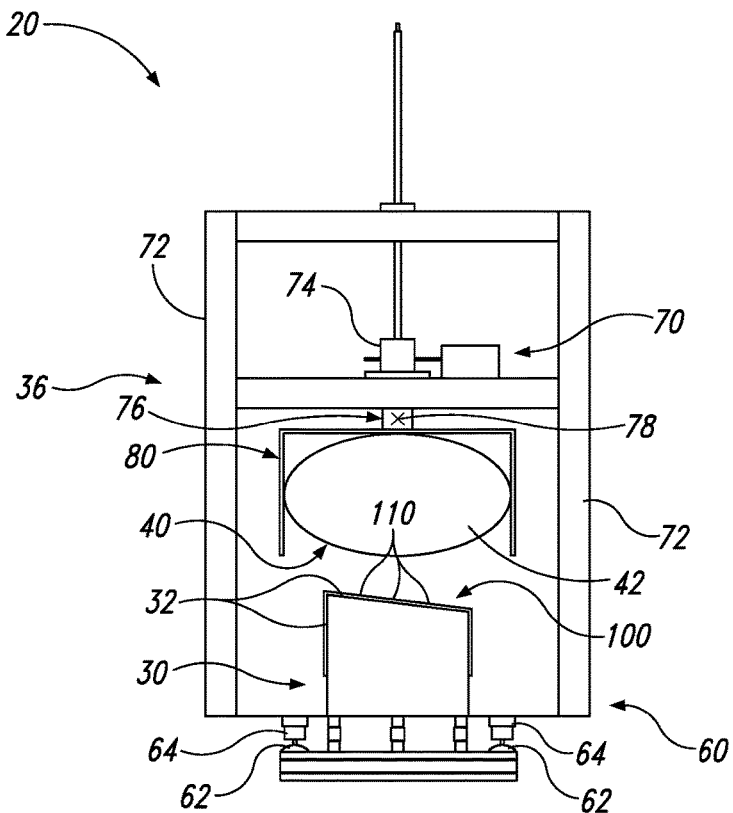
FIG. 6 is a less schematic transverse cross-sectional view of the system of FIG. 4.

FIG. 3 is a schematic representation of examples of a system 20, according to the present disclosure, for incrementally forming a composite part. FIG. 4 is a less schematic profile view of a system 20, according to the present disclosure, for incrementally forming a composite part 100, while FIG. 5 is a less schematic side view of system 20 of FIG. 4 and FIG. 6 is a less schematic transverse cross-sectional view of system 20 of FIG. 4. FIGS. 4-6 may include and/or be more detailed representations of system 20 of FIG. 3. As such, any structure, element, component, feature, and/or function that is discussed herein with reference to one of FIGS. 3-6 may be included in and/or utilized with any of FIGS. 3-6 without departing from the scope of the present disclosure.

System 20 includes a forming mandrel 30 that includes and/or defines at least one forming surface 32. System 20 also includes a forming machine 36, which may be adapted, configured, designed, and/or constructed to press one or more plies 110 of composite material against forming surface 32 to deform the one or more plies 110 and/or to conform the one or more plies 110 to a surface profile of forming surface 32. In the context of system 20, forming surface 32 may include those portion(s) of an outer surface of forming mandrel 30 that operatively contact ply 110 and/or that deform ply 110 when forming machine 36 presses ply 110 thereagainst.

Forming machine 36 includes a forming bladder 40 that defines an internal volume 42. As illustrated in solid lines in FIG. 3, forming machine 36 also includes a pressure-regulating device 50 that is configured to regulate, control, establish, and/or maintain a pressure (e.g., a pressure that is greater than atmospheric pressure) within internal volume 42. Forming machine 36 also includes at least one positioning device 60, which is configured to selectively position and/or orient forming bladder 40 relative to, or with respect to, forming surface 32 of forming mandrel 30. This may include orienting at least a portion of forming machine 36, such as forming bladder 40 thereof, at a plurality of selected, or different, locations. As an example, FIG. 3 illustrates forming machine 36 in solid lines when at a first selected location and not operatively pressing ply 110 against forming surface 32. In addition, FIG. 3 illustrates forming machine 36 in dash-dot lines when at a second selected location that is different from the first selected location and operatively pressing ply 110 against forming surface 32.

As used herein, the phrases "operatively press," "operatively presses," and/or "operatively pressing," as well as the words "press," "presses," and/or "pressing," may indicate direct and/or indirect contact between a given ply 110 and forming surface 32 and/or forming bladder 40. As an example, and while being pressed against forming surface 32 by forming bladder 40, the given ply 110 may be in direct physical contact with forming surface 32, with forming bladder 40, and/or with both forming surface 32 and forming bladder 40. As another example, and while being pressed against forming surface 32, another ply 110, or even another material and/or film, may extend between the given ply 110 and forming surface 32 and/or forming bladder 40. As a more specific example, an intermediate film 120 may extend between the given ply 110 and forming bladder 40.

During operation of system 20, forming bladder 40 is configured to be inflated to a forming pressure, such as by pressure-regulating device 50 providing a fluid to internal volume 42, and to selectively and operatively press ply 110 of composite material against forming surface 32 at each of the plurality of selected locations. This operative pressing of ply 110 against forming surface 32 may conform corresponding portions of ply 110 to the surface profile of forming surface 32, thereby at least partially defining a composite part 100. Generally, forming bladder 40 may be maintained at, or near, the forming pressure while ply 110 is pressed against forming surface 32, as discussed in more detail herein with reference to process flow 150 of FIGS. 7-15 and methods 200 of FIG. 17. As such, pressure-regulating device 50 may be configured to permit fluid to leave forming bladder 40 responsive to a decrease in internal volume 42 and/or may add fluid to forming bladder 40 responsive to an increase in internal volume 42.

Forming mandrel 30 may include and/or be any suitable structure that may have, define, and/or include forming surface 32, and a surface profile of forming surface 32 may correspond to a surface profile, or a desired surface profile, of composite part 100. As such, forming surface 32 may be adapted, configured, designed, and/or constructed to receive one or more plies 110 of composite material such that forming machine 36 may conform the one or more plies 110 of composite material to the surface profile of forming surface 32.

As discussed, forming machine 36 may be configured for incremental forming of composite part 100. As such, a surface area of forming surface 32 may be greater than a contact area between forming surface 32 and forming bladder 40 when forming bladder 40 presses ply 110 against forming surface 32. This is illustrated in dashed lines in FIG. 3, where an extent 33 of forming surface 32 is such that forming bladder 40 will not contact an entirety of forming surface 32 when forming bladder 40 operatively presses ply 110 against forming surface 32. It is within the scope of the present discourse that extent 33 may include and/or be any suitable dimension of forming surface 32, such as a length 34, or longitudinal length 34, and/or a width 35 of forming surface 32. As an example, FIGS. 4-5 illustrate that length 34 of forming surface 32 may be greater than a corresponding length of forming machine 36 and/or of forming bladder 40 thereof.

The contact between forming surface 32 and forming bladder 40 is discussed in more detail herein with reference to process flow 150 of FIGS. 7-15. As used herein, the word "contact" may include direct and/or indirect contact. As an example, and with reference to FIG. 3, ply 110 may extend between forming bladder 40 and forming surface 32. Thus, forming bladder 40 may directly contact ply 110 and/or may indirectly contact forming surface 32 when pressing ply 110 against forming surface 32. However, and as illustrated in dashed lines in FIG. 3, an intermediate film 120 may extend between forming bladder 40 and ply 110. Under these conditions, forming bladder 40 may directly contact intermediate film 120 and may indirectly contact both ply 110 and forming surface 32. Examples of intermediate film 120 include a contact film, a release film, a fluoropolymer film, and/or a film that is approved for contact with ply 110.

With continued reference to FIG. 3, and when length 34 of forming surface 32 is greater than a corresponding length 44 of forming bladder 40, positioning device 60 may be configured to selectively move forming bladder 40 along length 34. Additionally or alternatively, and when width 35 of forming surface 32 is greater than a corresponding width 45 of forming bladder 40, positioning device 60 may be configured to selectively move forming bladder 40 across width 35.

It is within the scope of the present disclosure that forming surface 32 may have and/or define any suitable shape. As an example, forming surface 32 may be a planar, or at least substantially planar, forming surface 32. As another example, forming surface 32 may be arcuate in at least one dimension, as illustrated in FIGS. 4-5.

Forming bladder 40 may include any suitable structure that may define and/or surround internal volume 42 and/or that may operatively press ply 110 against forming surface 32 while forming bladder 40 is inflated to the forming pressure. As an example, forming bladder 40 may include an elastomeric body that defines internal volume 42. As additional examples, forming bladder 40 may include and/or be a fluid bladder, an air bladder, and/or a resilient forming bladder.

It is within the scope of the present disclosure that, subsequent to inflation of forming bladder 40, such as to the forming pressure, forming bladder 40 may be shaped, designed, and/or configured to operatively press a central region of a pressed portion of ply 110 against forming surface 32 prior to operatively pressing a peripheral region of the pressed portion against forming surface 32. This is discussed in more detail herein with reference to process flow 150 of FIGS. 7-15.

As illustrated in FIG. 3, forming surface 32 may be configured to receive a plurality of stacked plies 110 of composite material. Under these conditions, the plurality of stacked plies 110 may be layered, one on top of the other, to form and/or define composite part 100. When forming surface 32 receives the plurality of stacked plies 110, it is within the scope of the present disclosure that forming bladder 40 may be configured to operatively press each of the plurality of stacked plies 110 against forming surface 32. This may include concurrently pressing at least two, or even the plurality of, stacked plies 110 of composite material against forming surface 32 and/or sequentially pressing at least two different, or even each of the plurality of, stacked plies 110 of composite material against forming surface 32.

Pressure-regulating device 50 may include any suitable structure that may be adapted, configured, designed, and/or constructed to regulate the pressure within internal volume 42, to inflate forming bladder 40, and/or to maintain the pressure within internal volume 42 at, or near, the forming pressure prior to, during, and/or subsequent to forming a given ply 110 against forming surface 32. This may include supplying fluid to internal volume 42 and/or permitting fluid to flow from internal volume 42 responsive to changes in internal volume 42 and/or responsive to shroud 80 acting against internal forming bladder 40. As an example, pressure-regulating device 50 may include and/or be a pressurizing fluid supply that is configured to selectively inflate forming bladder 40 to the forming pressure.

It is within the scope of the present disclosure that pressure-regulating device 50 further may be configured to maintain the pressure within internal volume 42 to within a threshold pressure differential of the forming pressure while forming bladder 40 operatively presses ply 110 against forming surface 32. Examples of the threshold pressure differential include threshold pressure differentials of less than 5 kilopascals (kPa), less than 10 kPa, less than 15 kPa, less than 20 kPa, less than 25 kPa, less than 30 kPa, less than 50 kPa, or less than 75 kPa.

As an example, pressure-regulating device 50 may be configured to permit fluid to exit forming bladder 40 while forming bladder 40 operatively presses ply 110 against forming surface 32. As more specific examples, pressure-regulating device 50 may not include and/or be a positive displacement device pressure-regulating device and/or may be configured to generate and maintain a given pressure differential thereacross, with this given pressure differential corresponding to the forming pressure and/or to the compaction pressure. As additional, more specific examples, pressure-regulating device 50 may include and/or be a fan, a blower, a cyclone, a tornado, a venturi pump, and/or a pressure relief valve.

It is within the scope of the present disclosure that pressure-regulating device 50 further may be configured to selectively inflate forming bladder 40 to a compaction pressure that is greater than the forming pressure. Under these conditions, and subsequent to forming bladder 40 being utilized to operatively press ply 110 against forming surface 32, as illustrated in dash-dot lines in FIG. 3, the pressure within internal volume 42 may be increased to the compaction pressure to compact ply 110 against forming surface 32.

Positioning device 60 may include and/or be any suitable structure that may be adapted, configured, designed, and/or constructed to selectively position forming bladder 40 relative to forming surface 32 at the plurality of selected locations. As examples, positioning device 60 may include an automated positioning device, a motorized positioning device, and/or a manually actuated positioning device. As a more specific example, and as illustrated in FIGS. 4-6, positioning device 60 may include and/or be a linear guide 62 and/or a linear actuator 64. As illustrated in dashed lines in FIG. 3, positioning device 60 further may include a locking mechanism 66 that is configured to selectively and operatively retain positioning device 60 at a selected one, or even each, of the plurality of selected locations.

It is within the scope of the present disclosure that positioning device 60 may be configured to operatively translate forming machine 36 and/or forming bladder 40 thereof in any suitable direction, along any suitable axis, and/or within any suitable plane. As an example, positioning device 60 may be configured to operatively translate forming machine 36 and/or forming bladder 40 horizontally, or at least substantially horizontally, in a horizontal plane, or within an at least substantially horizontal plane, along a length of forming mandrel 30, and/or across a width of forming mandrel 30.

It is within the scope of the present disclosure that system 20 may be configured such that forming bladder 40 selectively and operatively presses ply 110 against forming surface 32 responsive to being inflated to the forming pressure. Alternatively, and as illustrated in dashed lines in FIG. 3 and in solid lines in FIGS. 4-6, system 20 further may include an engagement structure 70, or even a plurality of engagement structures 70, that may be adapted, configured, designed, and/or constructed to selectively and operatively engage forming bladder 40 with ply 110 and/or with forming surface 32. This may include selectively and operatively engaging forming bladder 40 with ply 110 and/or with forming surface 32 subsequent to inflation of forming bladder 40 to the forming pressure.

As an example, engagement structure 70 may be configured to operatively translate forming bladder 40 relative to forming surface 32. This may include operative translation of forming bladder 40 toward forming surface 32, operative translation of forming bladder 40 away from forming surface 32, operative translation of forming bladder 40 vertically, operative translation of forming bladder 40 at least substantially vertically, operative translation of forming bladder 40 in a vertical direction, and/or operative translation of forming bladder 40 in an at least substantially vertical direction. Additionally or alternatively, this also may include selectively varying a distance, or a vertical distance, between forming surface 32 and forming bladder 40.

It is within the scope of the present disclosure that engagement structure 70, when present, may include and/or be any suitable structure. As examples, engagement structure 70 may be separate and/or distinct from positioning device 60, may form a portion of positioning device 60, and/or may be operatively interlinked with positioning device 60, such as via a support structure 72, which also may be referred to herein as a support tower 72. As additional examples, engagement structure 70 may include and/or be an automated engagement structure 70, a motorized engagement structure 70, and/or a manually actuated engagement structure 70. As a more specific example, engagement structure 70 may include and/or be a screw jack 74, a linear actuator, a motor, an electric motor, and/or a pneumatic motor.

It is within the scope of the present disclosure that engagement structure 70 may include and/or be a pivoting engagement structure 70 that is configured to permit forming bladder 40 and/or shroud 80 to pivot relative to forming surface 32 about a pivot axis 78, as illustrated in FIGS. 3-6. Pivot axis 78 may be defined by a pivot structure 76 that may form a portion of engagement structure 70 and/or that may operatively interlink engagement structure 70 to forming bladder 40. Such a configuration may improve operative contact between forming bladder 40 and ply 110 when forming bladder 40 operatively presses ply 110 against forming surface 32, especially when forming surface 32 is nonplanar, arcuate, contoured, and/or complex. Examples of pivot structure 76 include a knuckle joint, a u-joint, and/or a constant velocity joint.

It is within the scope of the present disclosure that pivot axis 78 may extend in any suitable direction. As an example, pivot axis 78 may extend along, be parallel to, and/or be aligned with a longitudinal axis of forming surface 32 and/or of forming mandrel 30 (i.e., may extend along a length of forming surface 32 and/or of forming mandrel 30). Additionally or alternatively, pivot axis 78 may extend along, be parallel to, and/or be aligned with a transverse axis of forming surface 32 and/or of forming mandrel 30 (i.e., may extend perpendicular, or at least substantially perpendicular, to the length of forming surface 32 and/or of forming mandrel 30).

As discussed in more detail herein, system 20 and/or engagement structure 70 thereof may be adapted, configured, designed, constructed, and/or programmed to selectively regulate and/or control a rate at which forming bladder 40 operatively presses ply 110 against forming surface 32. Such regulation and/or control may regulate and/or control the pressure within internal volume 42 and/or may permit system 20 to maintain the pressure within internal volume 42 to within the threshold pressure differential of the forming pressure while ply 110 is conformed to forming surface 32 by forming machine 36.

As illustrated in dashed lines in FIG. 3 and in solid lines in FIGS. 4-6, system 20 and/or forming machine 36 thereof further may include a shroud 80. Shroud 80 may be adapted, configured, designed, constructed, and/or shaped to surround at least a portion of forming bladder 40. As examples, shroud 80 may surround and/or extend at least partially around at least 1, at least 2, or at least 3 sides of forming bladder 40. As illustrated, shroud 80 may have and/or define a U-shaped, or at least substantially U-shaped transverse cross-sectional shape; however, this is not required. As discussed in more detail herein with reference to process flow 150 of FIGS. 7-15, shroud 80 may be configured to press forming bladder 40 against both a horizontal portion of forming surface 32 and also against a vertical portion of forming surface 32.

Shroud 80 may be formed from any suitable material, or materials, and/or may have any suitable property, or properties. As an example, shroud 80 may include and/or be a rigid, or at least substantially rigid, shroud 80.

As illustrated in dashed lines in FIG. 3, system 20 further may include a controller 90. Controller 90 may be adapted, configured, and/or programmed to control the operation of at least a portion of system 20. As examples, controller 90 may control the operation of pressure-regulating device 50, positioning device 60, and/or engagement structure 70, when present. This may include controlling system 20 to perform any suitable portion of methods 200, which are discussed in more detail herein with reference to FIG. 17.

As an example, controller 90 may be programmed to regulate a rate at which forming bladder 40 presses ply 110 against forming surface 32, such as to regulate a pressure within internal volume 42. As another example, controller 90 may be programmed to control the operation of pressure-regulating device 50 to regulate the pressure within internal volume 42. As yet another example, and subsequent to ply 110 being operatively pressed against forming surface 32, controller 90 may be programmed to increase the pressure within internal volume 42 to the compaction pressure and/or to compact ply 110 against forming surface 32.

It is within the scope of the present disclosure that system 20 and/or forming machine 36 thereof further may include a pressure detector 92. Pressure detector 92 may be configured to monitor the pressure within internal volume 42 and/or to convey a pressure signal 94, which may be indicative of the pressure within internal volume 42, to controller 90. Under these conditions, controller 90 may be programmed to control the operation of system 20 based, at least in part, on pressure signal 94. Additionally or alternatively, pressure detector 92 may include and/or be a pressure gauge 92 and/or a mechanical pressure gauge 92 that may not, necessarily, generate and/or convey pressure signal 94.

It is also within the scope of the present disclosure that system 20 and/or forming machine 36 thereof may include a proximity indicator 97. Proximity indicator 97, when present, may be configured to monitor and/or detect a distance between at least a portion of forming machine 36 and forming surface 32 and/or to monitor and/or detect when the portion of forming machine 36 is within a threshold distance of forming surface 32. In addition, proximity indicator 97 also may be configured to convey a proximity signal 98 to controller 90. Proximity signal 98 may be indicative of the distance between the portion of forming machine 36 and forming surface 32 and/or may be indicative of whether or not the portion of forming machine 36 is within the threshold distance of forming surface 32. Examples of the portion of forming machine 36 include forming bladder 40 and/or shroud 80. Examples of proximity indicator 97 include a distance sensor, a force sensor, and/or a pressure sensor.

Composite part 100 may include and/or be any suitable composite part 100 that may be formed from the plurality of plies 110 of composite material. Examples of composite part 100 include a stringer for an aircraft, a spar for an aircraft, and/or an angular composite part for an aircraft. However, system 20 may be utilized to form composite parts 100 that are not designed to form a portion of an aircraft.

It is within the scope of the present disclosure that plies 110 within composite part 100 may be single, continuous plies 110 that may extend across an entirety of forming surface 32. Additionally or alternatively, it is also within the scope of the present disclosure that one or more ply 110 may be formed from a plurality of ply segments 112 that together extend across the entirety of forming surface 32. Stated another way, a given layer, or ply 110, within composite part 100 may be formed from a single, continuous sheet of composite material and/or may be formed from a plurality of segments, sections, or pieces of composite material, with these segments, sections, and/or pieces of composite material being referred to herein as ply segments 112 and abutting one another to form and/or define the given layer.

Plies 110 of composite material may include any suitable structure and/or structures. As examples, plies 110 may include a plurality of fibers, such as a plurality of carbon, polymeric, and/or glass fibers. As additional examples, plies 110 may include a resin material, such as an epoxy, an adhesive, and/or a polymeric resin. As further examples, plies 110 may include a pre-impregnated, or pre-preg, material that includes the plurality of fibers and the resin material.

As illustrated in dashed lines in FIG. 3, system 20 further may include an indexing structure 96. Indexing structure 96, when present, may be configured to operatively locate each ply segment 112 at a desired, target, or specified location on forming surface 32. Examples of indexing structure 96 include physical indexing structures 96, such as an indexing fence, and/or optical indexing structures 96, such as an optical layout template.

Figure 7:
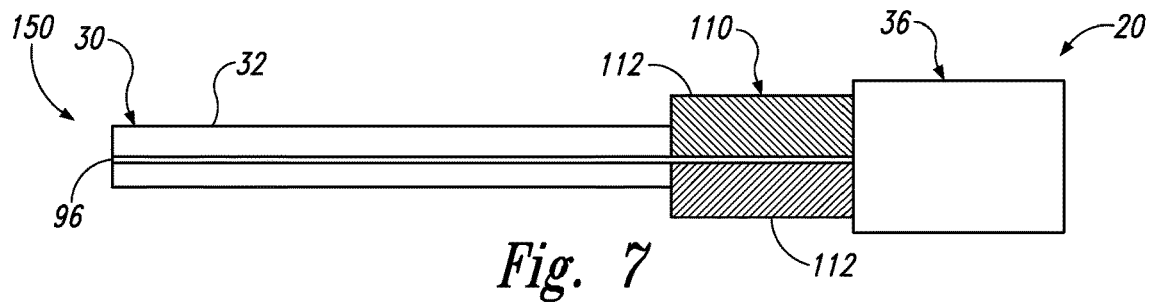
FIG. 7 is a schematic top view of a process flow for incrementally forming a composite part utilizing the systems and methods according to the present disclosure.
Figure 8:
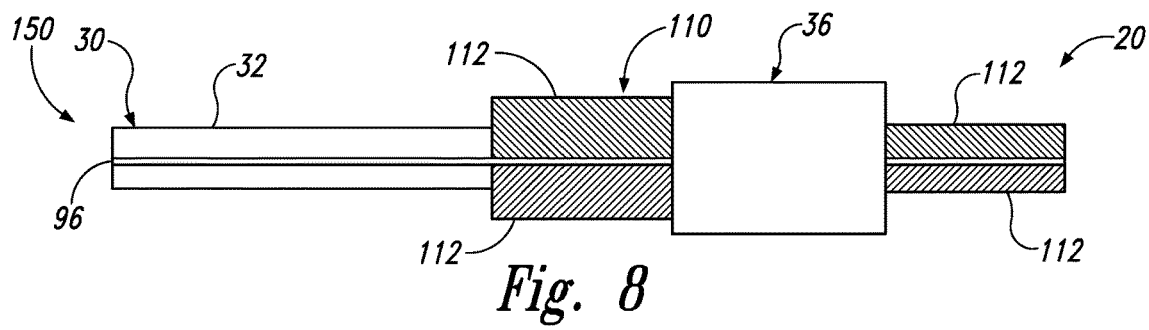
FIG. 8 is a schematic top view of a process flow for incrementally forming a composite part utilizing the systems and methods according to the present disclosure.
Figure 9:
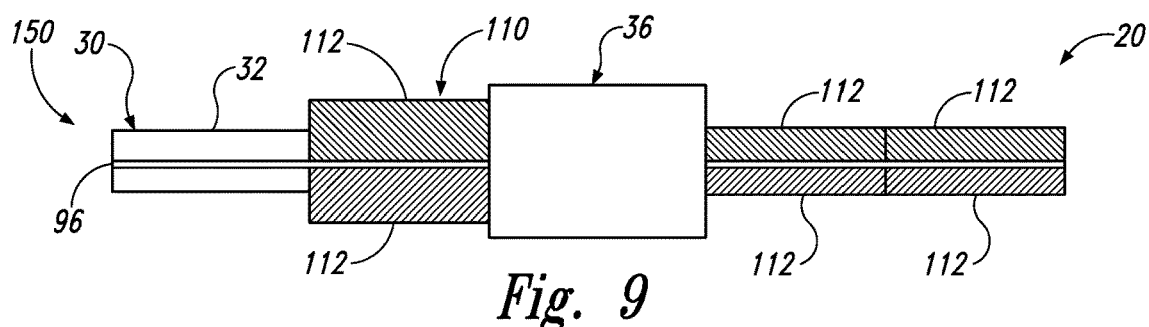
FIG. 9 is a schematic top view of a process flow for incrementally forming a composite part utilizing the systems and methods according to the present disclosure.
Figure 10:
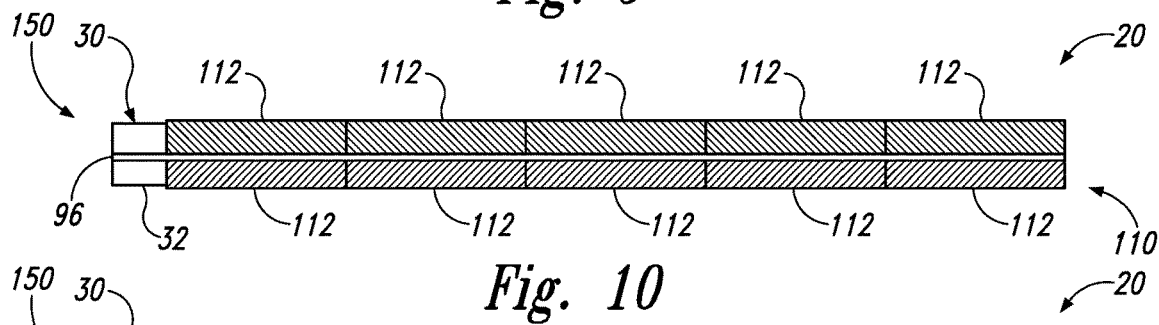
FIG. 10 is a schematic top view of a process flow for incrementally forming a composite part utilizing the systems and methods according to the present disclosure.
Figure 11:
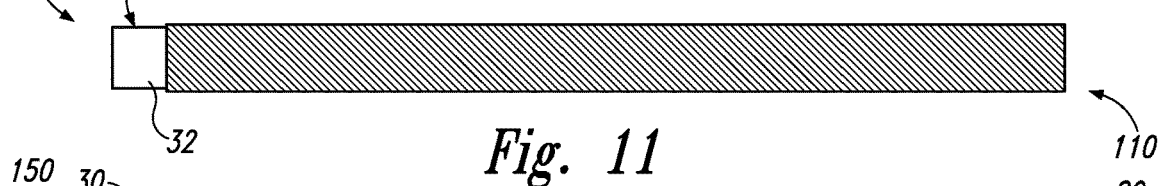
FIG. 11 is a schematic top view of a process flow for incrementally forming a composite part utilizing the systems and methods according to the present disclosure.
Figure 12:
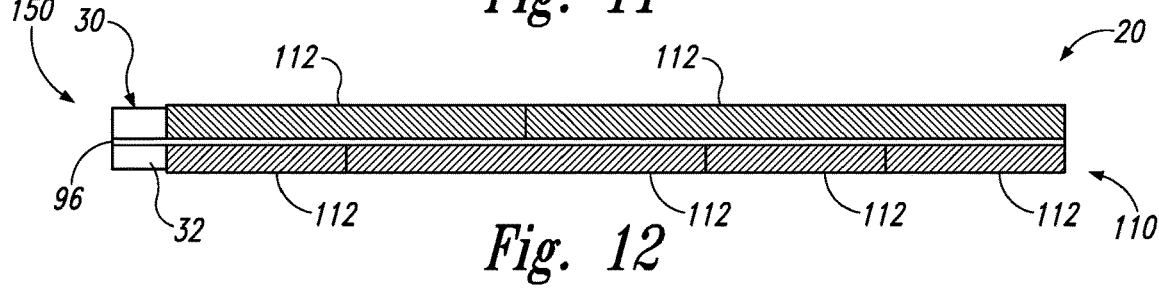
FIG. 12 is a schematic top view of a process flow for incrementally forming a composite part utilizing the systems and methods according to the present disclosure.
Figure 13:
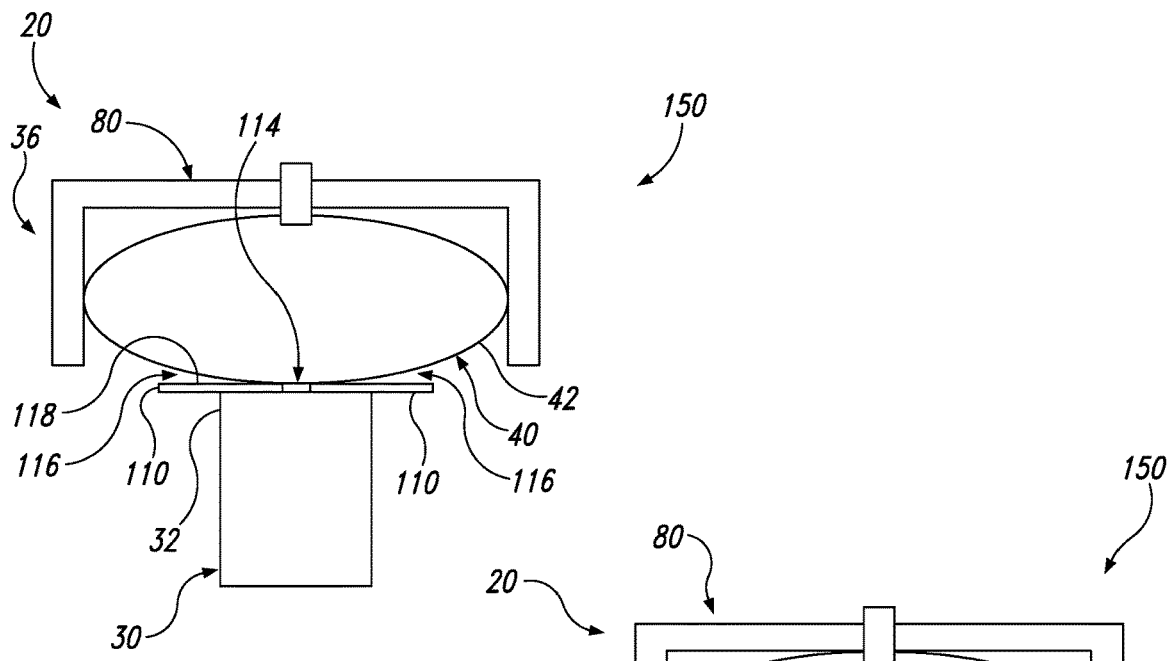
FIG. 13 is a schematic cross-sectional view of a process flow for incrementally forming a composite part utilizing the systems and methods according to the present disclosure.
Figure 14:
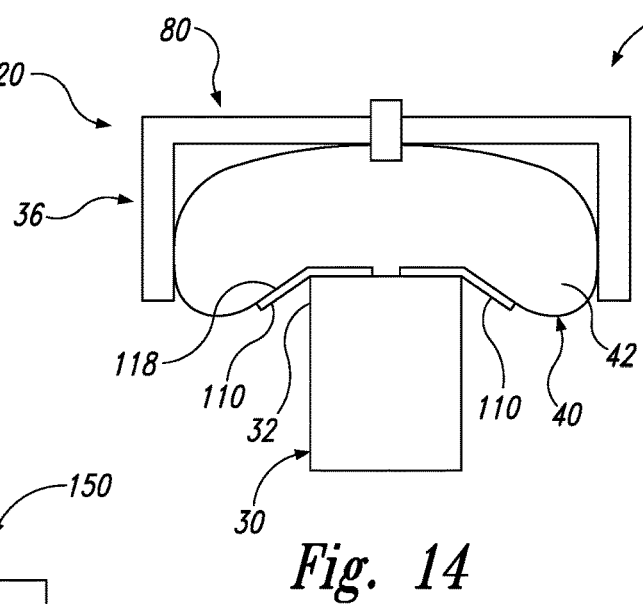
FIG. 14 is a schematic cross-sectional view of a process flow for incrementally forming a composite part utilizing the systems and methods according to the present disclosure.
Figure 15:
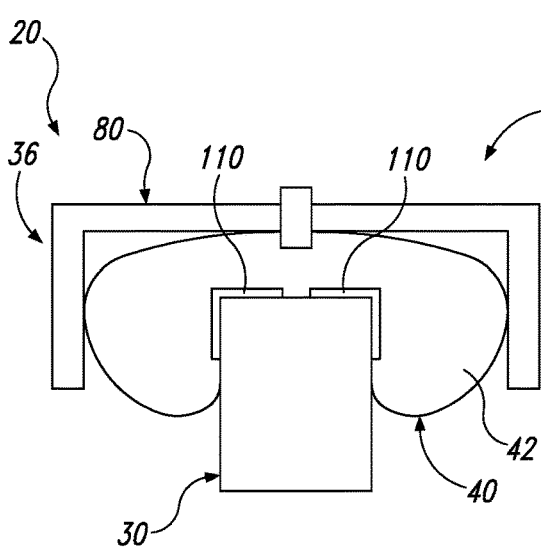
FIG. 15 is a schematic cross-sectional view of a process flow for incrementally forming a composite part utilizing the systems and methods according to the present disclosure.

FIGS. 7-12 are schematic top views of a process flow 150 for incrementally forming composite part 100 utilizing the systems and methods according to the present disclosure, while FIGS. 13-15 are schematic cross-sectional views of process flow 150. As illustrated in FIG. 7, forming machine 36 initially may be located at a first selected location along the length of a forming mandrel 30 and may operatively press a first portion of a ply 110 of composite material against a forming surface 32 that is defined by forming mandrel 30.

An example of the process that may be utilized to operatively press ply 110 against forming surface 32 is illustrated in FIGS. 13-15. As illustrated in FIG. 13, forming machine 36 may include a forming bladder 40 that initially may operatively press a central region 114 of ply 110 against forming surface 32 prior to operatively pressing a peripheral region 116 against forming surface 32.

Subsequently, and as illustrated in FIG. 14, forming bladder 40 may operatively contact an entirety, or at least substantially the entirety, of an exposed, upper, or bladder-facing surface 118 of ply 110 may press ply 110 toward, against, and/or into contact with forming surface 32. This may include directing ply 110 to bend around one or more surface contours of forming surface 32 and/or pressing ply 110 into contact with both horizontal and vertical portions of forming surface 32, as illustrated. As illustrated in FIG. 15, forming bladder 40 may be pressed even further over forming mandrel 30, thereby pressing an entirety of ply 110 against forming surface 32, and a shroud 80 may constrain forming bladder 40 such that forming bladder 40 presses the entirety of ply 110 against forming surface 32. Subsequently, and as discussed, a pressure within an internal volume 42 of forming bladder 40 may be increased to compact ply 110 against forming surface 32.

Returning to FIGS. 7-12, and as illustrated in FIGS. 8-9, forming machine 36 may be progressively moved along and/or across forming surface 32 to operatively press ply 110 against forming surface 32 at each of the plurality of selected locations, thereby conforming an entirety of ply 110 to forming surface 32. In the example of FIGS. 7-10, a given ply 110 is formed from a plurality of ply segments 112;

however, this is not required. As an example, and as illustrated in FIG. 11, a single, continuous sheet of composite material may form and/or define a given ply 110. Additionally or alternatively, FIG. 12 illustrates that, when a given ply 110 includes the plurality of ply segments 112, ply segments 112 may be arranged with any suitable relative orientation and/or may have any suitable size.

Figure 16:
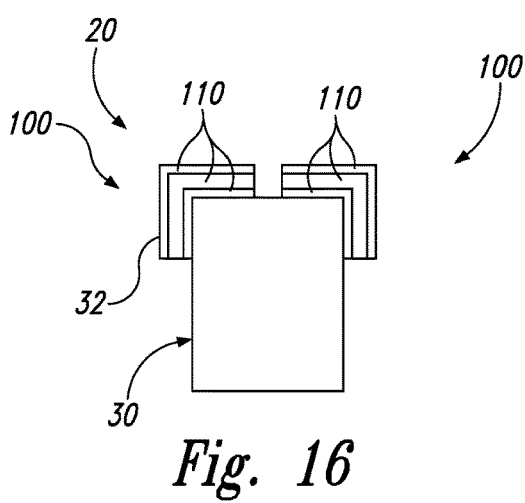
FIG. 16 is a schematic cross-sectional view of a composite part that has been formed on a forming mandrel utilizing the systems and methods according to the present disclosure.

Process flow 150 may be repeated any suitable number of times to locate and/or build-up any suitable number of plies 110 of composite material on forming surface 32 of forming mandrel 30 and to thereby form and/or define composite part 100. This is illustrated in FIG. 16, which is a schematic cross-sectional view of a composite part 100 that has been formed on a forming mandrel 30 utilizing the systems and methods according to the present disclosure. As illustrated, composite part 100 includes a plurality of stacked and/or layered plies 110 of composite material that may be located and/or built-up on forming surface 32 in a sequential manner, as discussed.

Figure 17:
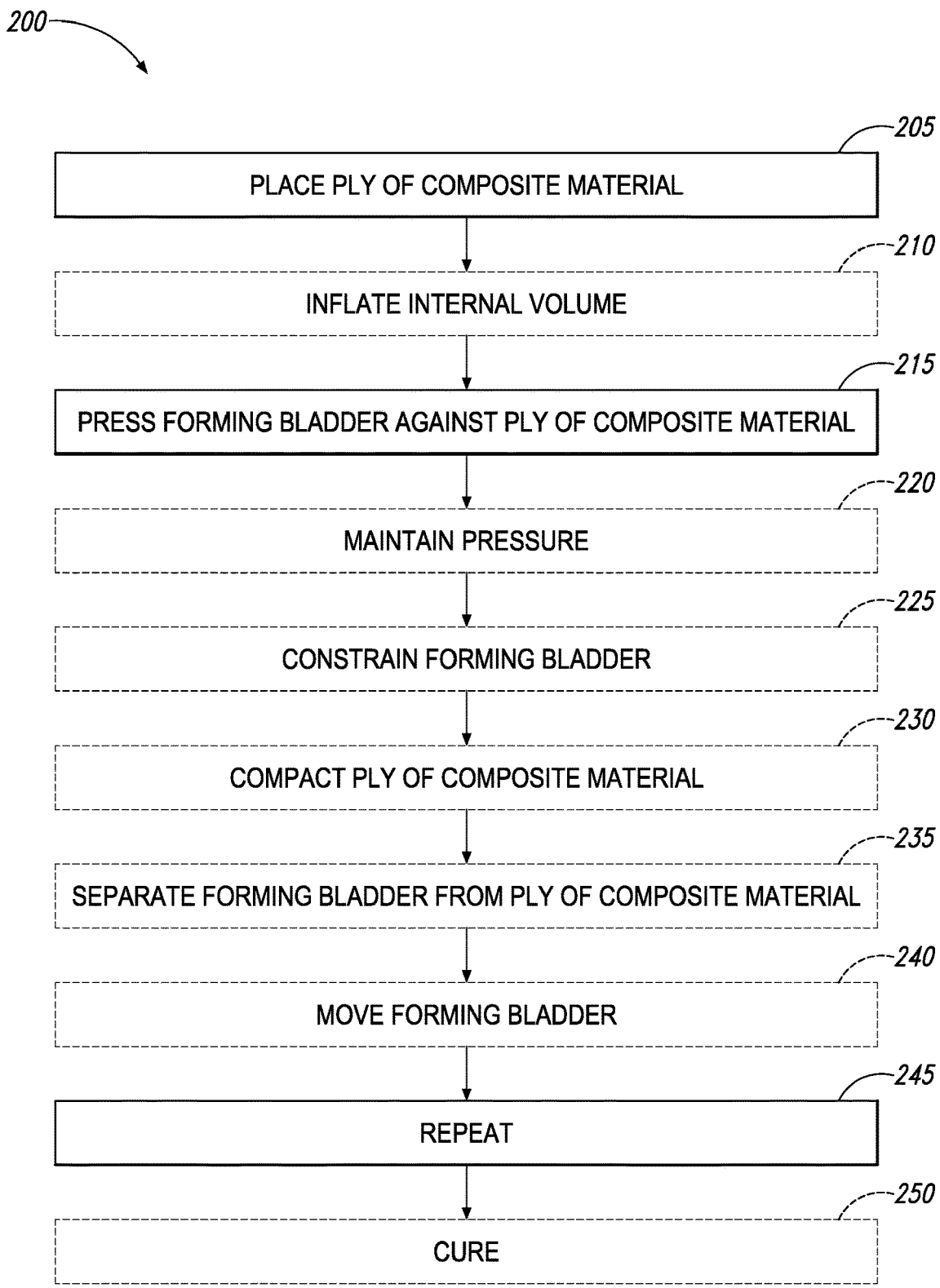
FIG. 17 is flowchart depicting methods, according to the present disclosure, of incrementally forming a composite part.

FIG. 17 is flowchart depicting methods 200, according to the present disclosure, of incrementally forming a composite part. Methods 200 include placing a ply of composite material at 205 and may include inflating an internal volume of a forming bladder at 210. Methods 200 further include pressing the forming bladder against the ply of composite material at 215 and may include maintaining a pressure at 220, constraining the forming bladder at 225, compacting the ply of composite material at 230, separating the forming bladder from the ply of composite material at 235, and/or moving the forming bladder at 240. Methods 200 further include repeating at least a portion of the methods at 245 and may include curing the composite structure at 250.

Placing the ply of composite material at 205 may include placing the ply of composite material on a forming surface of a forming mandrel. Examples of the forming surface, of the forming mandrel, and of the ply of composite material are disclosed herein. It is within the scope of the present disclosure that the placing at 205 may include bringing at least a portion of the ply of composite material into direct and/or indirect contact with the forming surface such that the ply of composite material is at least partially supported by the forming surface.

It is also within the scope of the present disclosure that the placing at 205 may include utilizing an indexing structure to aid in the placing and/or to operatively locate the ply of composite material at a desired, target, or specified location on the forming surface. Examples of the indexing structure are disclosed herein.

As discussed in more detail herein, the placing at 205 may include, or consist of, placing a single, continuous ply of composite material that extends across an entirety of the forming surface. Under these conditions, the pressing at 215 may include pressing a selected portion of the single, continuous ply of composite material against the forming surface while a remainder of the ply of composite material is not pressed against the forming surface. Additionally or alternatively, the placing at 205 also may include placing at least two discrete and/or separate ply segments that together define the ply of composite material. Under these conditions, the pressing at 215 may include pressing either an entirety of a given ply segment or less than the entirety of the given ply segment against the forming surface.

Inflating the internal volume of the forming bladder at 210 may include inflating the internal volume to a forming pressure. This may include inflating in any suitable manner and/or utilizing any suitable pressure-regulating device, examples of which are disclosed herein. It is within the scope of the present disclosure that the inflating at 210 may be performed prior to the pressing at 215 and/or that the pressing at 215 may be a result of, or responsive to, the inflating at 210.

Pressing the forming bladder against the ply of composite material at 215 may include pressing at a selected location to press a selected portion of the ply of composite material against the forming surface and/or to conform the selected portion of the ply of composite material to a surface profile of the forming surface. The pressing at 215 may be accomplished in any suitable manner. As an example, the pressing at 215 may be a result of, or may be responsive to, the inflating at 210, as discussed. As another example, the pressing at 215 may include lowering the forming bladder into contact with the selected portion of the ply of composite material and/or moving the forming bladder in a vertical direction, such as via utilizing an engagement structure, to deform the selected portion of the ply of composite material between the forming bladder and the forming surface and/or to conform the selected portion of the ply of composite material to the surface profile of the forming surface.

In general, the systems and methods disclosed herein utilize incremental forming to conform the ply of composite material to the forming surface and/or to form the composite part. As such, and as discussed herein with reference to process flow 150 of FIGS. 7-15, the forming surface and the ply of composite material generally are larger than the forming bladder. Thus, the repeating at 245 is utilized to form an entirety of a given ply of composite material.

As an example, a surface area of the forming surface may be greater than a contact area between the forming surface and the forming bladder during the pressing at 215. As another example, a surface area, an exposed surface area, and/or an upper surface area of the ply of composite material may be greater than a surface area, an exposed surface area, and/or an upper surface area of the selected portion of the ply of composite material and/or may be greater than the contact area between the forming surface and the forming bladder during the pressing at 215.

The pressing at 215 further may include conforming the forming bladder to the forming surface such that a surface profile of the forming bladder corresponds to the surface profile of the forming surface. As discussed herein, the pressing at 215 may include operatively contacting the forming bladder with a central, or upper, region of the selected portion of the ply of composite material prior to operatively contacting the forming bladder with a peripheral, or side, region of the selected portion of the ply of composite material. Such a method may retain the ply of composite material on the forming surface during the pressing at 215 and/or may decrease a potential for wrinkling of the ply of composite material during the pressing at 215.

As discussed herein, the ply of composite material may include and/or be defined by a plurality of ply segments. Under these conditions, the pressing at 215 may include pressing a given ply segment of the plurality of ply segments. A surface area, an exposed surface area, or an upper surface area of the given ply segment may be less than the contact area between the forming surface and the forming bladder during the pressing at 215. Thus, the pressing at 215 may include pressing an entirety of the given ply segment at one time. Additionally or alternatively, the surface area, the exposed surface area, and/or the upper surface area of the given ply segment may be greater than the contact area between the forming surface and the forming bladder during the pressing at 215. Thus, the repeating at 245 may include repeating to press the entirety of the given ply segment.

As also discussed herein, a proximity indicator may be utilized to monitor and/or detect a distance between at least a portion of the forming machine and the forming surface and/or to monitor and/or detect when the portion of the forming machine is within a threshold distance of the forming surface. Under these conditions, the methods 200 further may include ceasing the pressing at 215 responsive to the proximity indicator detecting that the portion of the forming machine is within the threshold distance of the forming surface.

Maintaining the pressure at 220 may include maintaining the pressure within the internal volume during the pressing at 215. This may include maintaining the pressure at, or near, the forming pressure and/or maintaining the pressure to within a threshold pressure differential of the forming pressure. Additionally or alternatively, the maintaining at 220 also may include maintaining with, or utilizing, a pressure-regulating device. Examples of the threshold pressure differential and the pressure-regulating device are disclosed herein.

The maintaining at 220 may include permitting fluid, such as air, to exit the forming bladder during the pressing at 215. This may include permitting the fluid to exit through, or via, the pressure-regulating device. Additionally or alternatively, the maintaining at 220 also may include regulating a rate at which the forming bladder presses the ply of composite material against the forming surface, such as during the pressing at 215.

As discussed, a pressure detector may be utilized to monitor the pressure within the internal volume of the forming bladder. Under these conditions, methods 200 further may include measuring the pressure within the internal volume with the pressure detector and the maintaining at 220 may include maintaining based, at least in part, on the measured pressure.

Constraining the forming bladder at 225 may include constraining deformation and/or expansion of the forming bladder in at least one direction. As an example, the constraining at 225 may include constraining with a shroud, examples of which are disclosed herein. It is within the scope of the present disclosure that the constraining at 225 may include constraining to permit the forming bladder to press the ply of composite material against the forming surface across an entirety of the surface profile of the forming surface and/or across an entirety of the ply of composite material. The constraining at 225 may include restricting expansion, motion, and/or deformation of the forming bladder on one, two, three, or more than three sides of the forming bladder.

Compacting the ply of composite material at 230 may include compacting the ply of composite material against the forming surface and may be accomplished in any suitable manner. As an example, the compacting at 230 may include increasing the pressure within the internal volume of the forming bladder to a compaction pressure, which may be greater than the forming pressure. Under these conditions, the pressure may be increased subsequent to the pressing at 215 and/or subsequent to completion of the pressing at 215. As an additional example, the compacting at 230 may include vacuum compacting the ply of composite material, such as via covering the ply of composite material with a vacuum bag and evacuating a space between the ply of composite material and the vacuum bag.

Separating the forming bladder from the ply of composite material at 235 may include establishing a spaced-apart relationship between the forming bladder and the ply of composite material and may be performed subsequent to the placing at 205, subsequent to the inflating at 210, and/or subsequent to the pressing at 215. The separating at 235 may include separating at each of the plurality of selected locations, separating to permit and/or facilitate the moving at 240, and/or separating to permit and/or facilitate the repeating at 245. The separating at 235 may be performed in any suitable manner. As examples, the separating at 235 may include translating the forming bladder in a vertical direction and/or translating the forming bladder with the engagement structure.

Moving the forming bladder at 240 may include moving the forming bladder to each location in the plurality of selected locations prior to pressing the forming bladder against the ply of composite material at each location. The moving at 240 may be accomplished in any suitable manner. As an example, the moving at 240 may include translating the forming bladder along a length of the forming mandrel, translating the forming bladder across a width of the forming mandrel, translating the forming bladder horizontally, and/or translating the forming bladder with a positioning device, examples of which are disclosed herein.

Repeating at least the portion of the methods at 245 may include repeating a plurality of times and/or at the plurality of selected locations to selectively and operatively press the ply of composite material against the forming surface at each of the plurality of selected locations. This may include conforming corresponding portions of the ply of composite material to the surface profile of the forming surface to at least partially define the composite part.

As discussed, the ply of composite material may be defined by the plurality of discrete ply segments. Under these conditions, the repeating at 245 also may include repeating the placing at 205 for each discrete ply segment in the plurality of discrete ply segments and subsequently repeating the pressing at 215 to press the forming bladder against each ply segment. This process may define the ply of composite material and/or may conform the ply of composite material to the surface profile of the forming surface.

Additionally or alternatively, and as also discussed, the ply of composite material may consist of a single, continuous ply of composite material. Under these conditions, the repeating at 245 may include repeating the pressing at 215 a plurality of times and/or at a plurality of different locations on the single, continuous ply of composite material.

As discussed, the ply of composite material may be a first ply of composite material, and the composite part may include a plurality of plies of composite material that may be stacked, one on top of the other, to define a layered stack of composite material. Under these conditions, the repeating at 245 additionally or alternatively may include placing a second ply of composite material on the first ply of composite material and subsequently pressing the forming bladder against the second ply of composite material to form the layered stack of composite material.

Curing the composite structure at 250 may include curing to generate, form, harden, consolidate, and/or define the composite part and may be accomplished in any suitable manner and/or with any suitable timing and/or sequence during methods 200. As an example, the curing at 250 may be performed subsequent to the repeating at 245. As another example, the curing at 250 may include heating the ply of composite material and/or the plurality of stacked plies of composite material.

Figure 18:
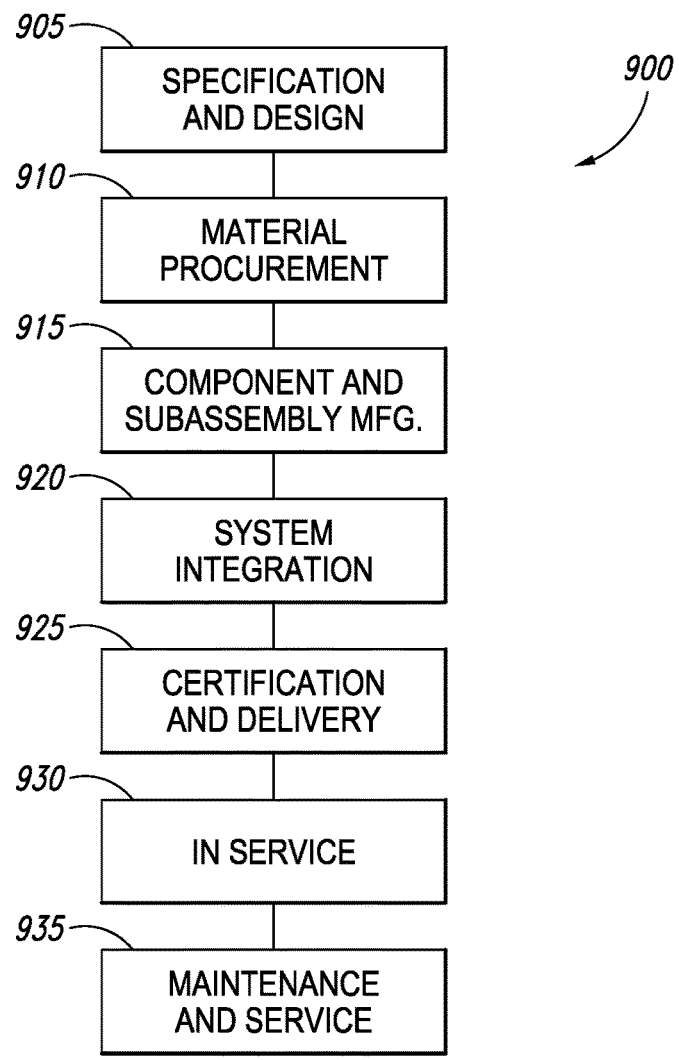
FIG. 18 is a flow diagram of aircraft production and service methodology.
Figure 19:
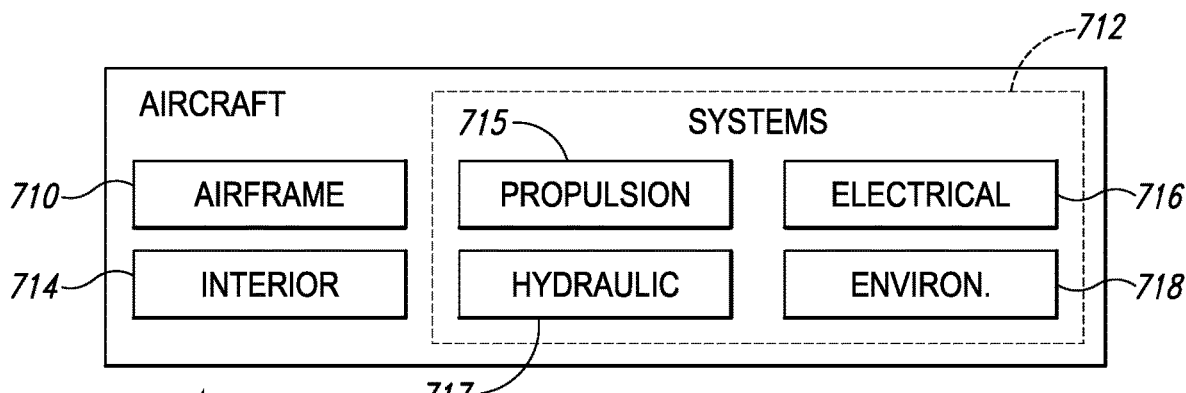
FIG. 19 is a block diagram of an aircraft.

Referring now to FIGS. 18-19, embodiments of the disclosure may be described in the context of an aircraft manufacturing and service method 900, as shown in FIG. 18, and/or an aircraft 700, as shown in FIG. 19. During preproduction, exemplary method 900 may include specification and design 905 of the aircraft 700 and material procurement 910. During production, component and subassembly manufacturing 915 and system integration 920 of the aircraft 700 take place. Thereafter, the aircraft 700 may go through certification and delivery 925 in order to be placed in service 930. While in service by a customer, the aircraft 700 is scheduled for routine maintenance and service 935 (which also may include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 19, aircraft 700 produced by exemplary method 900 may include an airframe 710 with a plurality of systems 712 and an interior 714. Examples of high-level systems 712 include one or more of a propulsion system 715, an electrical system 716, a hydraulic system 717, and an environmental system 718. Any number of other systems may be included. Although an aerospace example is shown, the principles of the invention may be applied to other industries, such as the automotive industry.

Systems and methods embodied herein may be employed during any one or more of the stages of the manufacturing and service method 900. For example, components or subassemblies corresponding to component and subassembly manufacturing process 915 may be fabricated or manufactured in a manner similar to components or subassemblies produced while the aircraft 700 is in service. Also, one or more of system embodiments, method embodiments, or a combination thereof may be utilized during the production stages 915 and 920, for example, by substantially expediting assembly of or reducing the cost of an aircraft 700. Similarly, one or more of system embodiments, method embodiments, or a combination thereof may be utilized while the aircraft 700 is in service, for example and without limitation, to maintenance and service 935.

Examples of inventive subject matter according to the present disclosure are described in the following enumerated paragraphs:

A1. A system for incrementally forming a composite part, the system comprising:
  a forming mandrel that includes a forming surface, wherein a surface profile of the forming surface corresponds to a surface profile of the composite part, and further wherein the forming surface is configured to receive a ply of composite material; and
  a forming machine including:
  (i) a forming bladder that defines an internal volume;
  (ii) a pressure-regulating device configured to regulate a pressure within the internal volume; and
  (iii) a positioning device configured to selectively position the forming bladder relative to the forming surface at a plurality of selected locations;
  wherein the forming bladder is configured to be inflated to a forming pressure and to selectively and operatively press the ply of composite material against the forming surface at each of the plurality of selected locations to conform corresponding portions of the ply of composite material to the surface profile of the forming surface and at least partially define the composite part.

A2. The system of paragraph A1, wherein a surface area of the forming surface is greater than a contact area between the forming surface and the forming bladder when the forming bladder presses the ply of composite material against the forming surface.

A3. The system of any of paragraphs A1-A2, wherein a length of the forming surface is greater than a corresponding length of the forming bladder.

A4. The system of paragraph A3, wherein a longitudinal length of the ply of composite material is greater than the corresponding length of the forming bladder.

A5. The system of any of paragraphs A3-A4, wherein the positioning device is configured to selectively move the forming bladder along the length of the forming surface.

A6. The system of any of paragraphs A1-A5, wherein a width of the forming surface is greater than a corresponding width of the forming bladder.

A7. The system of paragraph A6, wherein a width of the ply of composite material is greater than the corresponding width of the forming bladder.

A8. The system of any of paragraphs A6-A7, wherein the positioning device is configured to selectively move the forming bladder across the width of the forming surface.

A9. The system of any of paragraphs A1-A8, wherein the forming surface is a planar, or at least substantially planar, forming surface.

A10. The system of any of paragraphs A1-A9, wherein the forming surface is arcuate in at least one dimension.

A11. The system of any of paragraphs A1-A10, wherein the forming bladder includes at least one of a fluid bladder and an air bladder.

A12. The system of any of paragraphs A1-A11, wherein the forming bladder includes an elastomeric body that defines the internal volume.

A13. The system of any of paragraphs A1-A12, wherein the forming bladder is a resilient forming bladder.

A14. The system of any of paragraphs A1-A13, wherein the forming bladder is configured to selectively and operatively press the ply of composite material against the forming surface while the forming bladder is inflated to the forming pressure.

A15. The system of any of paragraphs A1-A14, wherein, subsequent to inflation of the forming bladder, the forming bladder is shaped to operatively press a central region of a pressed portion of the ply of composite material against the forming surface prior to operatively pressing a peripheral region of the pressed portion of the ply of composite material against the forming surface.

A16. The system of any of paragraphs A1-A15, wherein the pressure-regulating device includes a pressurizing fluid supply configured to selectively inflate the forming bladder to the forming pressure.

A17. The system of any of paragraphs A1-A16, wherein the pressure-regulating device is configured to selectively inflate the forming bladder to a compaction pressure that is greater than the forming pressure subsequent to pressing the ply of composite material against the forming surface.

A18. The system of any of paragraphs A1-A17, wherein the pressure-regulating device is configured to maintain the pressure within the internal volume of the forming bladder to within a threshold pressure differential of the forming pressure while the forming bladder operatively presses the ply of composite material against the forming surface.

A19. The system of paragraph A18, wherein the threshold pressure differential is less than 5 kilopascals (kPa), less than 10 kPa, less than 15 kPa, less than 20 kPa, less than 25 kPa, less than 30 kPa, less than 50 kPa, less than 50 kPa, or less than 75 kPa.

A20. The system of any of paragraphs A18-A19, wherein the pressure-regulating device is configured to permit fluid and/or a gas to exit the forming bladder while the forming bladder operatively presses the ply of composite material against the forming surface.

A21. The system of any of paragraphs A1-A20, wherein the pressure-regulating device includes at least one of a fan, a blower, a cyclone, a tornado, a venturi pump, and a pressure relief valve.

A22. The system of any of paragraphs A1-A21, wherein the pressure-regulating device is not a positive-displacement device.

A23. The system of any of paragraphs A1-A22, wherein the positioning device is an automated positioning device.

A24. The system of any of paragraphs A1-A23, wherein the positioning device is at least one of a motorized positioning device and a manually actuated positioning device.

A25. The system of any of paragraphs A1-A24, wherein the positioning device includes at least one of a linear guide and a linear actuator.

A26. The system of any of paragraphs A1-A25, wherein the positioning device includes a positioning device locking mechanism configured to selectively and operatively retain the positioning device at a selected one of the plurality of selected locations.

A27. The system of any of paragraphs A1-A26, wherein the positioning device is configured to operatively translate the forming bladder relative to the forming mandrel horizontally, or at least substantially horizontally, and/or along a length of the forming mandrel.

A28. The system of any of paragraphs A1-A27, wherein the forming machine further includes an engagement structure configured to selectively and operatively engage the forming bladder with the forming surface, optionally subsequent to inflation of the forming bladder to the forming pressure.

A29. The system of paragraph A28, wherein the engagement structure is configured to operatively translate the forming bladder relative to the forming mandrel vertically, or at least substantially vertically.

A30. The system of any of one paragraphs A28-A29, wherein the engagement structure is configured to selectively vary a distance, and optionally a vertical distance, between the forming surface and the forming bladder.

A31. The system of any of paragraphs A28-A30, wherein the engagement structure is an automated engagement structure.

A32. The system of any of paragraphs A28-A31, wherein the engagement structure is a motorized engagement structure.

A33. The system of any of paragraphs A28-A32, wherein the engagement structure is configured to selectively regulate a rate at which the forming bladder operatively presses the ply of composite material against the forming surface to regulate the pressure within the internal volume.

A34. The system of any of paragraphs A28-A33, wherein the engagement structure pivots to permit the forming bladder to pivot relative to the forming surface about a pivot axis, optionally wherein the engagement structure includes a pivot structure that defines the pivot axis.

A35. The system of paragraph A34, wherein the pivot axis is parallel, or at least substantially parallel, to a longitudinal axis of the forming surface.

A36. The system of any of paragraphs A34-A35, wherein the pivot axis is parallel, or at least substantially parallel to a transverse axis of the forming surface.

A37. The system of any of paragraphs A28-A36, wherein the forming machine includes a plurality of engagement structures.

A38. The system of any of paragraphs A28-A37, wherein the engagement structure includes a screw jack.

A39. The system of any of paragraphs A28-A38, wherein the forming machine further includes a support structure that operatively links the engagement structure to the positioning device.

A40. The system of paragraph A39, wherein the support structure includes a support tower.

A41. The system of any of paragraphs A1-A40, wherein the forming machine further includes a shroud that surrounds at least a portion of the forming bladder.

A42. The system of paragraph A41, wherein the shroud surrounds at least three sides of the forming bladder.

A43. The system of any of paragraphs A41-A42, wherein the shroud has a U-shaped transverse cross-sectional shape.

A44. The system of any of paragraphs A41-A43, wherein the shroud is configured to press the forming bladder against a horizontal portion of the forming surface and also against a vertical portion of the forming surface.

A45. The system of any of paragraphs A41-A43, wherein the shroud is a rigid, or at least substantially rigid, shroud.

A46. The system of any of paragraphs A1-A45, wherein the forming machine further includes a controller programmed to control the operation of at least a portion of the system.

A47. The system of paragraph A46, wherein the controller is programmed to control the operation of at least one of:
(i) the pressure-regulating device;
(ii) the positioning device; and
(iii) a/the engagement structure.

A48. The system of any of paragraphs A46-A47, wherein the controller is programmed to perform the method of any of paragraphs B1-B36.

A49. The system of any of paragraphs A46-A48, wherein the controller is programmed to regulate a rate at which the forming bladder presses the ply of composite material against the forming surface to regulate the pressure within the internal volume of the forming bladder.

A50. The system of any of paragraphs A46-A49, wherein the controller is programmed to control the operation of the pressure-regulating device to regulate the pressure within the internal volume of the forming bladder.

A51. The system of any of paragraphs A46-A50, wherein the forming machine further includes a pressure detector configured to monitor the pressure within the internal volume of the forming bladder and convey a pressure signal to the controller.

A52. The system of any of paragraphs A46-A51, wherein, subsequent to the ply of composite material being operatively pressed against the forming surface by the forming bladder, the controller is programmed to increase the pressure within the internal volume of the forming bladder to compact the ply of composite material against the forming surface.

A53. The system of any of paragraphs A1-A52, wherein the system further includes an intermediate film that extends between the forming bladder and the ply of composite material.

A54. The system of paragraph A53, wherein the intermediate film includes at least one of a contact film, a release film, and a fluoropolymer film.

A55. The system of any of paragraphs A1-A54, wherein the system includes the ply of composite material.

A56. The system of paragraph A55, wherein the ply of composite material is pressed against the forming surface by the forming bladder.

A57. The system of any of paragraphs A55-A56, wherein the ply of composite material is in direct operative contact with both the forming surface and the forming bladder.

A58. The system of any of paragraphs A55-A57, wherein the ply of composite material is in indirect operative contact with both the forming surface and the forming bladder.

A59. The system of any of paragraphs A55-A58, wherein a surface profile of the ply of composite material corresponds to the surface profile of the forming surface.

A60. The system of any of paragraphs A1-A59, wherein the ply of composite material is a single, continuous ply of composite material that extends across an entirety of the forming surface.

A61. The system of any of paragraphs A1-A60, wherein the ply of composite material includes a plurality of discrete ply segments that together extend across an/the entirety of the forming surface.

A62. The system of any of paragraphs A1-A61, wherein the system further includes an indexing structure configured to operatively locate each discrete ply segment in a/the plurality of discrete ply segments at a desired location on the forming surface.

A63. The system of paragraph A62, wherein the indexing structure includes at least one of an optical layout template and an indexing fence.

A64. The system of any of paragraphs A1-A63, wherein the forming surface is configured to receive a plurality of stacked plies of composite material to define the composite part.

A65. The system of paragraph A64, wherein the plurality of stacked plies of composite material is received on the forming surface.

A66. The system of any of paragraphs A64-A65, wherein the forming bladder is configured to sequentially press each of the plurality of stacked plies of composite material against the forming surface.

A67. The system of any of paragraphs A64-A66, wherein the forming bladder is configured to concurrently press at least two of the plurality of stacked plies of composite material against the forming surface.

A68. The system of any of paragraphs A1-A67, wherein the composite part includes at least one of a stringer for an aircraft, a spar for an aircraft, and/or an angular composite part for an aircraft.

B1. A method of incrementally forming a composite part, the method comprising:

placing a ply of composite material on a forming surface of a forming mandrel;

pressing a forming bladder against the ply of composite material at a selected location to press a selected portion of the ply of composite material against the forming surface and conform the selected portion of the ply of composite material to a surface profile of the forming surface; and repeating the pressing a plurality of times at a plurality of selected locations to selectively and operatively press the ply of composite material against the forming surface at each of the plurality of selected locations to conform corresponding portions of the ply of composite material to the surface profile of the forming surface and at least partially define the composite part.

B2. The method of paragraph B1, wherein the placing includes utilizing an indexing structure to operatively locate the ply of composite material at a desired location on the forming surface.

B3. The method of any of paragraphs B1-B2, wherein the placing consists of placing a single, continuous ply of composite material.

B4. The method of any of paragraphs B1-B3, wherein the placing includes placing at least two discrete ply segments that together define the ply of composite material.

B5. The method of any of paragraphs B1-B4, wherein the pressing includes lowering the forming bladder into contact with the selected portion of the ply of composite material to deform the selected portion of the ply of composite material between the forming bladder and the forming surface.

B6. The method of any of paragraphs B1-B5, wherein a surface area of the forming surface is greater than a contact area between the forming surface and the forming bladder during the pressing.

B7. The method of any of paragraphs B1-B6, wherein a surface area of the ply of composite material is greater than a surface area of the selected portion of the ply of composite material.

B8. The method of any of paragraphs B1-B7, wherein a surface area of the ply of composite material is greater than a/the contact area between the forming surface and the forming bladder during the pressing.

B9. The method of any of paragraphs B1-B8, wherein the pressing includes deforming the forming bladder such that a surface profile of the forming bladder corresponds to the surface profile of the forming surface.

B10. The method of any of paragraphs B1-B9, wherein the pressing includes operatively contacting the forming bladder with a central region of the selected portion of the ply of composite material prior to operatively contacting the forming bladder with a peripheral region of the selected portion of the ply of composite material.

B11. The method of any of paragraphs B1-B10, wherein the pressing includes pressing a given ply segment of a plurality of discrete ply segments that together define the ply of composite material.

B12. The method of paragraph B11, wherein a surface area of the given ply segment is less than a/the contact area between the forming surface and the forming bladder during the pressing.

B13. The method of any of paragraphs B11-B12, wherein a surface area of the given ply segment is greater than a/the contact area between the forming surface and the forming bladder during the pressing.

B14. The method of any of paragraphs B1-B13, wherein the repeating further includes repeating the placing for each ply segment in a/the plurality of discrete ply segments on the forming surface and subsequently repeating the pressing to press the forming bladder against each discrete ply segment to define the ply of composite material and to conform the ply of composite material to the surface profile of the forming surface.

B15. The method of any of paragraphs B1-B14, wherein the repeating includes repeating the pressing a plurality of times on a single, continuous ply of composite material.

B16. The method of any of paragraphs B1-B15, wherein the ply of composite material is a first ply of composite material, wherein the repeating further includes placing a second ply of composite material on the first ply of composite material and subsequently pressing the forming bladder against the second ply of composite material to form a layered stack of composite material.

B17. The method of any of paragraphs B1-B16, wherein the repeating further includes moving the forming bladder to each location of the plurality of selected locations prior to pressing the forming bladder against the ply of composite material at each location of the plurality of selected locations.

B18. The method of paragraph B17, wherein the moving includes translating the forming bladder along a length of the forming mandrel.

B19. The method of any of paragraphs B17-B18, wherein the moving includes translating the forming bladder across a width of the forming mandrel.

B20. The method of any of paragraphs B1-B19, wherein, prior to the pressing, the method further includes inflating an internal volume of the forming bladder to a forming pressure.

B21. The method of any of paragraphs B1-B20, wherein, during the pressing, the method further includes maintaining a pressure within the internal volume to within a threshold pressure differential of a/the forming pressure with a pressure-regulating device.

B22. The method of paragraph B21, wherein the threshold pressure differential is less than 5 kilopascals (kPa), less than 10 kPa, less than 15 kPa, less than 20 kPa, less than 25 kPa, less than 30 kPa, less than 50 kPa, or less than 75 kPa.

B23. The method of any of paragraphs B21-B22, wherein the maintaining the pressure includes permitting fluid and/or a gas to exit the forming bladder, via the pressure-regulating device, during the pressing.

B24. The method of any of paragraphs B21-B23, wherein the maintaining the pressure further includes regulating a rate at which the forming bladder presses the ply of composite material against the forming surface.

B25. The method of any of paragraphs B1-B24, wherein the repeating further includes separating the forming bladder from the ply of composite material at each of the plurality of selected locations.

B26. The method of paragraph B25, wherein the separating includes separation to permit the repeating the pressing at another location of the plurality of selected locations.

B27. The method of any of paragraphs B1-B26, wherein, subsequent to the repeating, the method further includes curing the ply of composite material, and optionally a plurality of plies of composite material, to generate the composite part.

B28. The method of paragraph B27, wherein the curing includes heating the ply of composite material, and optionally the plurality of plies of composite material.

B29. The method of any of paragraphs B1-B28, wherein, during the pressing, the method further includes constraining the forming bladder with a shroud.

B30. The method of paragraph B29, wherein the constraining includes constraining to permit the forming bladder to press the ply of composite material against the forming surface across an entirety of the surface profile of the forming surface.

B31. The method of any of paragraphs B29-B30, wherein the constraining includes restricting expansion of the forming bladder on one, optionally two, optionally three, and further optionally more than three sides of the forming bladder.

B32. The method of any of paragraphs B1-B31, wherein the method further includes compacting the ply of composite material against the forming surface.

B33. The method of paragraph B32, wherein the compacting includes increasing a/the pressure within an/the internal volume of the forming bladder subsequent to the pressing.

B34. The method of paragraph B33, wherein the increasing includes increasing to a compaction pressure that is greater than the forming pressure.

B35. The method of paragraph B34, wherein the compacting includes vacuum compacting the ply of composite material.

B36. The method of any of paragraphs B1-B35, wherein the method is performed utilizing any suitable component and/or structure of the system of any of paragraphs A1-A68.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and systems, and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein, and such inventive subject matter may find utility in apparatuses, systems, and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A method of incrementally forming a composite part, the method comprising:

placing a ply of composite material on a forming surface of a forming mandrel;

pressing a forming bladder against the ply of composite material at a selected location to press a selected portion of the ply of composite material against the forming surface and conform the selected portion of the ply of composite material to a surface profile of the forming surface; and repeating the pressing a plurality of times at a plurality of selected locations to selectively and operatively press the ply of composite material against the forming surface at each of the plurality of selected locations to conform corresponding portions of the ply of composite material to the surface profile of the forming surface and at least partially define the composite part;

wherein a length of the forming surface is greater than a corresponding length of the forming bladder; and further wherein the repeating includes selectively and operatively pressing the ply of composite material against an entirety of the length of the forming surface.

2. The method of claim 1, wherein the repeating further includes moving the forming bladder to each location of the plurality of selected locations prior to pressing the forming bladder against the ply of composite material at each location of the plurality of selected locations.

3. The method of claim 2, wherein the moving includes translating the forming bladder along a length of the forming mandrel.

4. The method of claim 2, wherein the moving includes translating the forming bladder across a width of the forming mandrel.

5. The method of claim 1, wherein at least one selected location of the plurality of selected locations is spaced-apart from at least one other selected location of the plurality of selected locations along a length of the forming mandrel.

6. The method of claim 1, wherein the plurality of selected locations is spaced-apart along a length of the forming mandrel.

7. The method of claim 1, wherein a surface area of the forming surface is greater than a contact area between the forming surface and the forming bladder during the pressing.

8. The method of claim 1, wherein a surface area of the ply of composite material is greater than a surface area of the selected portion of the ply of composite material.

9. The method of claim 1, wherein a surface area of the ply of composite material is greater than a contact area between the forming surface and the forming bladder during the pressing.

10. The method of claim 1, wherein the repeating further includes separating the forming bladder from the ply of composite material at each of the plurality of selected locations.

11. The method of claim 10, wherein the separating includes separation to permit the repeating the pressing at another location of the plurality of selected locations.

12. The method of claim 1, wherein the pressing includes operatively contacting the forming bladder with a central region of the selected portion of the ply of composite material prior to operatively contacting the forming bladder with a peripheral region of the selected portion of the ply of composite material.

13. The method of claim 1, wherein the repeating further includes repeating the placing for each ply segment in a plurality of discrete ply segments on the forming surface and subsequently repeating the pressing to press the forming bladder against each discrete ply segment to define the ply of composite material and to conform the ply of composite material to the surface profile of the forming surface.

14. The method of claim 1, wherein the ply of composite material is a first ply of composite material, wherein the repeating further includes placing a second ply of composite material on the first ply of composite material and subsequently pressing the forming bladder against the second ply of composite material to form a layered stack of composite material.

15. The method of claim 1, wherein, during the pressing, the method further includes maintaining a pressure within an internal volume of the forming bladder to within a threshold pressure differential of a forming pressure with a pressure-regulating device.

16. The method of claim 15, wherein the maintaining the pressure includes permitting a gas to exit the forming bladder, via the pressure-regulating device, during the pressing.

17. The method of claim 15, wherein the maintaining the pressure further includes regulating a rate at which the forming bladder presses the ply of composite material against the forming surface.

18. The method of claim 1, wherein, during the pressing, the method further includes constraining the forming bladder with a shroud.

19. The method of claim 1, wherein the repeating includes translating the forming bladder along a linear guide that extends along the length of the forming surface.

20. The method of claim 1, wherein the repeating includes repeating the pressing a plurality of times on a single, continuous ply of composite material.

* * * * *